(12) United States Patent
Kataoka et al.

(10) Patent No.: US 9,929,607 B2
(45) Date of Patent: Mar. 27, 2018

(54) COMPRESSOR

(75) Inventors: Yoshihiro Kataoka, Kusatsu (JP);
Yasukazu Nabetani, Kusatsu (JP);
Kazuo Ida, Sakai (JP); Azusa Ujihara,
Uwajima (JP)

(73) Assignee: Daikin Industries, Ltd., Osaka (JP)

( * ) Notice: Subject to any disclaimer, the term of this patent is extended or adjusted under 35 U.S.C. 154(b) by 1659 days.

(21) Appl. No.: 12/864,423

(22) PCT Filed: Jan. 23, 2009

(86) PCT No.: PCT/JP2009/051093
§ 371 (c)(1),
(2), (4) Date: Jul. 23, 2010

(87) PCT Pub. No.: WO2009/093699
PCT Pub. Date: Jul. 30, 2009

(65) Prior Publication Data
US 2010/0296950 A1    Nov. 25, 2010

(30) Foreign Application Priority Data

Jan. 24, 2008 (JP) ................................ 2008-013743
May 16, 2008 (JP) ................................ 2008-129259
Jan. 20, 2009 (JP) ................................ 2009-009636

(51) Int. Cl.
*H02K 1/14*     (2006.01)
*F04B 39/02*    (2006.01)
(Continued)

(52) U.S. Cl.
CPC ......... *H02K 1/146* (2013.01); *F04B 39/0238* (2013.01); *F04C 23/008* (2013.01);
(Continued)

(58) Field of Classification Search
CPC .. F04B 39/0238; F04C 18/356; F04C 23/008; F04C 23/02; F04C 29/028; F04C 29/045;
(Continued)

(56) References Cited

U.S. PATENT DOCUMENTS 3,643,118 A * 2/1972 Ichiki ..................... H02K 1/146
                                                          310/179
5,045,742 A    9/1991 Armstrong et al.
(Continued)

FOREIGN PATENT DOCUMENTS

EP    1 065 376 A1    1/2001
EP    1 486 672 A2    12/2004
(Continued)

OTHER PUBLICATIONS

European Search Report of corresponding EP Application No. 09 70 3162.9 dated Jun. 23, 2016.

*Primary Examiner* — Charles Freay
*Assistant Examiner* — Joseph Herrmann

(57) ABSTRACT

A compressor includes a hermetic container, a compression mechanism section disposed in the hermetic container, and a motor disposed in the hermetic container to drive the compression mechanism section. The motor has a rotor and a stator disposed so as to surround an outer periphery of the rotor. The stator includes a stator core and oil passage grooves. The stator core has a hollow circular cylindrical section and a plurality of circumferentially arranged teeth protruding radially inward from an outer peripheral surface of the hollow circular cylindrical section. The oil passage grooves are located radially outside of the teeth. The oil passage grooves are formed by cutting an outer peripheral surface of the hollow circular cylindrical section.

14 Claims, 14 Drawing Sheets

(51) Int. Cl.

| | | |
|---|---|---|
| *F04C 23/00* | (2006.01) | |
| *F04C 23/02* | (2006.01) | |
| *F04C 29/02* | (2006.01) | |
| *H02K 1/20* | (2006.01) | |
| *H02K 7/14* | (2006.01) | |
| *H02K 9/19* | (2006.01) | |
| *F04C 18/356* | (2006.01) | |
| *F04C 29/04* | (2006.01) | |

(52) U.S. Cl.
CPC ............ *F04C 23/02* (2013.01); *F04C 29/028* (2013.01); *H02K 1/20* (2013.01); *H02K 7/14* (2013.01); *F04C 18/356* (2013.01); *F04C 29/045* (2013.01); *F04C 2240/40* (2013.01); *H02K 9/19* (2013.01)

(58) Field of Classification Search
CPC ...... F04C 2240/40; H02K 1/146; H02K 1/20; H02K 5/20; H02K 7/14; H02K 9/19
USPC ........ 417/410.3, 423.8, 366; 310/54, 52, 58, 310/60 A, 64, 254.1
See application file for complete search history.

(56) References Cited

U.S. PATENT DOCUMENTS

| | | | | |
|---|---|---|---|---|
| 5,365,132 | A * | 11/1994 | Hann et al. ............ | 310/58 |
| 5,763,976 | A * | 6/1998 | Huard ..................... | 310/168 |
| 6,313,558 | B1 * | 11/2001 | Abukawa et al. ..... | 310/429 |
| 6,414,413 | B1 * | 7/2002 | Arai ............... | H02K 1/146 29/596 |
| 6,472,780 | B2 * | 10/2002 | Kikuchi et al. .......... | 310/52 |
| 6,533,558 | B1 | 3/2003 | Matsumoto et al. | |
| 6,582,207 | B2 * | 6/2003 | Matsumoto et al. ...... | 417/410.1 |
| 6,623,253 | B1 * | 9/2003 | Onoda et al. ............. | 417/366 |
| 6,680,550 | B2 * | 1/2004 | Matsunaga et al. ........ | 310/58 |
| 6,836,051 | B2 * | 12/2004 | Hiwaki et al. ........... | 310/254.1 |
| 7,164,218 | B2 * | 1/2007 | Kimura et al. ........ | 310/216.044 |
| 8,410,655 | B2 * | 4/2013 | Kojima ............... | F04C 29/0085 310/216.048 |
| 8,569,924 | B2 * | 10/2013 | Yasuda et al. ........ | 310/216.069 |
| 2001/0030483 | A1 * | 10/2001 | Masumoto et al. ......... | 310/216 |
| 2002/0109420 | A1 * | 8/2002 | Matsunaga et al. ........ | 310/58 |
| 2004/0219037 | A1 * | 11/2004 | Higuchi et al. .......... | 417/410.3 |
| 2005/0212377 | A1 * | 9/2005 | Wang et al. .............. | 310/259 |
| 2007/0210668 | A1 * | 9/2007 | Yoshino et al. .......... | 310/216 |
| 2009/0100861 | A1 * | 4/2009 | Higuchi et al. ........... | 62/468 |
| 2009/0123308 | A1 | 5/2009 | Taniwa et al. | |
| 2009/0174280 | A1 * | 7/2009 | Prudham ............... | 310/216.022 |

FOREIGN PATENT DOCUMENTS

| | | |
|---|---|---|
| JP | 1-159559 U | 11/1989 |
| JP | 2-221688 A | 9/1990 |
| JP | 2000-350390 A | 12/2000 |
| JP | 2001-12374 A | 1/2001 |
| JP | 2002-142390 A | 5/2002 |
| JP | 2004-346884 A | 12/2004 |
| JP | 2005-210826 A | 8/2005 |
| JP | 2005-245101 A | 9/2005 |
| JP | 2006-87222 A | 3/2006 |
| JP | 2006-238507 A | 9/2006 |
| JP | 2006-329067 A | 12/2006 |
| JP | 2007-255332 A | 10/2007 |
| JP | 2007-285266 A | 11/2007 |
| JP | 2007285266 A * | 11/2007 |

* cited by examiner

Fig.4

| REQUIRED EQUIVALENT AREA | EQUIVALENT AREA OF OUTER PERIPHERY OF STATOR CORE / CORE CUT AREA | | | | | | | | | |
|---|---|---|---|---|---|---|---|---|---|---|
| | 0.10 | 0.15 | 0.20 | 0.25 | 0.30 | 0.35 | 0.40 | 0.45 | 0.50 | |
| 4.9 | ○ | ○ | ○ | ○ | ○ | ○ | ○ | ○ | ○ | |
| 16.2 | × | × | × | × | ○ | ○ | ○ | ○ | ○ | |
| 30.0 | × | × | × | × | ○ | ○ | ○ | ○ | ○ | |
| 42.0 | × | × | × | × | × | ○ | ○ | ○ | ○ | |
| 55.0 | × | × | × | × | × | ○ | ○ | ○ | ○ | |
| 70.0 | × | × | × | × | × | | ○ | ○ | ○ | |
| 85.0 | × | × | × | × | × | | ○ | ○ | ○ | |
| 100.0 | × | × | × | × | × | | ○ | ○ | ○ | |
| 115.0 | × | × | × | × | × | | ○ | ○ | ○ | |
| 130.0 | × | × | × | × | × | | ○ | ○ | ○ | |
| 145.0 | × | × | × | × | × | × | ○ | ○ | ○ | |
| 165.0 | × | × | × | × | × | | ○ | ○ | ○ | |

$S = \pi r^2 / 2$
$L = r(\pi + 2)$
$d = 4S/L = 2\pi r/(\pi + 2)$

COMPRESSOR

CROSS-REFERENCE TO RELATED APPLICATIONS

This U.S. National stage application claims priority under 35 U.S.C. § 119(a) to Japanese Patent Application Nos. 2008/013743, filed in Japan on Jan. 24, 2008, 2008/129259, filed in Japan on May 16, 2008, and 2009-009636, filed in Japan on Jan. 20, 2009, the entire contents of which are hereby incorporated herein by reference.

TECHNICAL FIELD

This invention relates to a compressor for use in, for example, an air conditioner, a refrigerator and the like.

BACKGROUND ART

A conventional compressor has a hermetic container, a compression mechanism section disposed in this hermetic container, and a motor disposed in the hermetic container and driving the compression mechanism section through a shaft. An oil sump storing a lubricant is formed in a bottom section of the hermetic container (JP2001-12374A).

SUMMARY

Technical Problem

However, in the conventional compressor, since passages penetrating through upper and lower parts of the motor are narrow, a lubricant oil accumulated in the upper part of the motor is hardly returned to the oil sump, so that oil shortage in the oil sump occurs. Due to this oil shortage, the lubricant oil in the oil sump is not able to be efficiently sent to sliding portions of the compression mechanism section, bearings of the motor and the like, resulting in deterioration in reliability of the compressor. In particular, when carbon dioxide is used as a refrigerant, since a high-viscosity lubricant oil is used as the lubricant oil, it is more difficult for the lubricant oil to return to the oil sump.

A problem of this invention is to provide a compressor that prevents oil shortage in the oil sump.

Solution To Problem

In order to solve the problem, a compressor according to the present invention includes:

a hermetic container;

a compression mechanism section disposed in the hermetic container; and a motor disposed in the hermetic container and driving the compression mechanism section;

the motor having a rotor, and a stator disposed so as to surround an outer periphery of the rotor, the stator comprising a stator core, the stator core having a hollow circular cylindrical section and a plurality of teeth protruding radially inward from an outer peripheral surface of the hollow circular cylindrical section and arranged circumferentially;

the stator core further having oil passage grooves located radially outside of the teeth, the oil passage grooves being formed by cutting an outer peripheral surface of the hollow circular cylindrical section.

In this compressor, the stator core has oil passage grooves located radially outside of the teeth, each oil passage groove being formed by cutting an outer peripheral surface of the hollow circular cylindrical section. Therefore, it is possible to return a lubricant oil to the oil sump by passing through the oil passage grooves, so that oil shortage in the oil sump can be prevented. In particular, if carbon dioxide is used as the refrigerant, although a high-viscosity lubricant oil is used as the lubricant oil, it is possible to efficiently return the lubricant oil to the oil sump.

In accordance with one aspect of the present invention, the hermetic container has an oil sump, the oil passage grooves penetrate through one surface nearer to the oil sump of the stator core, and another surface thereof farther from the oil sump, and the oil passage grooves reach a position corresponding to an inner periphery of the hollow circular cylindrical section located radially outside of the teeth.

With such a compressor, since the oil passage grooves reach a position corresponding to an inner periphery of the hollow circular cylindrical section located radially outside of the teeth, it is possible to return the lubricant oil accumulated on the another-surface side of the stator core to the oil sump on the one-surface side of the stator core through the oil passage grooves, so that oil shortage in the oil sump is well prevented. In particular, if carbon dioxide is used as the refrigerant, although a high-viscosity lubricant oil is used as the lubricant oil, it is possible to efficiently return the lubricant oil to the oil sump.

In accordance with one aspect of the present invention, regarding the another surface of the stator core, the following relationships hold:

$$M=(1/4)\times\pi\times D^2, \text{ and } M/T \geq 0.4,$$

where T [mm$^2$] is a total area of all the oil passage grooves on the another surface of the stator core, D [mm] is a hydraulic diameter of all the oil passage grooves, and M [mm$^2$] is an equivalent area.

With such a compressor, since $M=(1/4)\times\pi\times D^2$, and $M/T\geq 0.4$ are satisfied, the oil passage grooves can sufficiently be secured, and the lubricant oil accumulated on the another-surface side of the stator core can reliably be returned to the oil sump on the one surface side of the stator core through the oil passage grooves.

In accordance with one aspect of the present invention, the number of the teeth is nine or more, and coils wound around the stator core are of concentrated winding type wherein the coils are wound around respective teeth, instead of being wound around a plurality of teeth.

With such a compressor, since the number of the teeth is nine or more, and the coils are wound around the stator core by the so-called concentrated winding method wherein the coils are wound around respective teeth instead of being wound around a plurality of teeth, the number of poles of the motor is increased and the width of the hollow circular cylindrical section of the stator core becomes smaller. However, it is possible to efficiently return the lubricant oil to the oil sump.

In accordance with one aspect of the present invention, the oil passage grooves have a generally semi-circular shape in plan view.

With such a compressor, since the oil passage grooves have a generally semi-circular shape in plan view, magnetic flux flows are secured so that deterioration in motor efficiency is prevented.

In accordance with one aspect of the present invention, a refrigerant in the hermetic container is carbon dioxide.

With such a compressor, since the refrigerant in the hermetic container is carbon dioxide, a high-viscosity lubricant oil is used. However, it is possible to efficiently return the lubricant oil to the oil sump.

In accordance with one aspect of the present invention, the hollow circular cylindrical section has the oil passage grooves, and a swaged portion located radially outside of a slot formed between adjacent ones of the teeth, and in a plane perpendicular to a shaft, assuming that, among those lines passing an intersection point of an imaginary circle circumscribing the hollow circular cylindrical section and a center line of a width of a tooth, a straight line having a shortest distance from the intersection point to a profile line of the slot is defined as an imaginary straight line, then a width of the stator core between a profile line of the oil passage groove and the profile line of the slot on this imaginary straight line is ½ or more of the width of the tooth, and has a value equal to or smaller than a value obtained by subtracting 4 mm from the shortest distance from the intersection point to the profile line of the slot.

With such a compressor, since the width of the stator core is a half or more of the width of the tooth, and has a value or less, which is obtained by subtracting 4 mm from the shortest distance, the passages for oil return can be secured, while securing magnetic flux paths.

ADVANTAGEOUS EFFECTS OF INVENTION

In the compressor of this invention, the stator core has oil passage grooves located radially outside of the teeth, each oil passage groove being formed by cutting an outer peripheral surface of the hollow circular cylindrical section. Therefore, it is possible to return a lubricant oil to the oil sump by passing through the oil passage grooves, so that oil shortage in the oil sump can be prevented.

In the compressor of this invention, since the oil passage groove reaches an inner periphery of the hollow circular cylindrical section located radially outside of each tooth, it is possible to return the lubricant oil accumulated on the other surface side of the stator core to the oil sump on the one surface side of the stator core through the oil passage grooves, and oil shortage in the oil sump can be prevented.

In the compressor of this invention, since the width of the stator core is a half or more of the width of the tooth, and has a value, which is obtained by subtracting 4 mm from the shortest distance, the passages for oil return can be secured, while securing magnetic flux paths.

BRIEF DESCRIPTION OF DRAWINGS

FIG. 4 shows whether oil return is good or poor under a relationship between a "ratio of an equivalent area of an outer periphery of a stator core to a core cut (oil passage grooves) area" and a "required equivalent area";

DESCRIPTION OF EMBODIMENTS

This invention will be described in detail by way of embodiments illustrated.

(First Embodiment)

Figure 1:
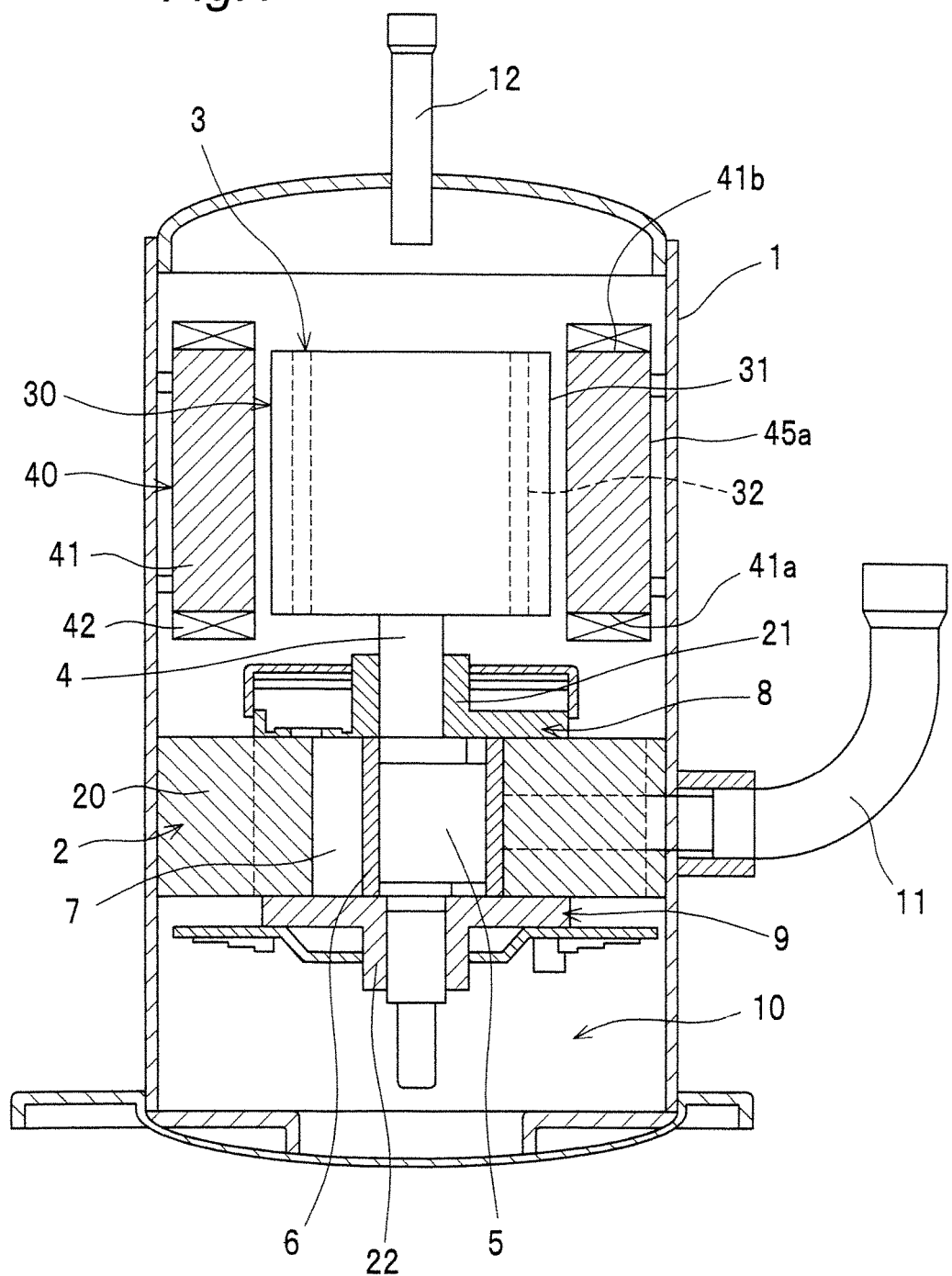
FIG. 1 is a vertical cross sectional view showing a first embodiment of the compressor of the present invention.

FIG. 1 shows a vertical cross sectional view of a first embodiment of a compressor of this invention. This compressor has a hermetic container 1, a compression mechanism section 2 disposed in the hermetic container 1, and a motor 3. This compressor is a rotary compressor.

A suction pipe 11 is connected to a lower lateral side of the hermetic container 1, while a discharge pipe 12 is connected at an upper side of the hermetic container 1. A refrigerant supplied from the suction pipe 11 is led to a suction side of the compression mechanism section 2. Although this refrigerant is carbon dioxide, it may be R410A, R22 or the like.

The motor 3 is disposed above the compression mechanism section 2, and drives the compression mechanism section 2 through a rotating shaft 4. The motor 3 is disposed in a high-pressure region in the hermetic container 1, which is filled with a high-pressure refrigerant discharged from the compression mechanism section 2.

An oil sump 10 where a lubricant oil is stored is formed in a lower part of the hermetic container 1. This lubricant oil passes through oil passages (not shown), which are provided in the rotating shaft 4, from the oil sump 10, and moves to sliding portions such as the compression mechanism section 2 and bearings of the motor 3 to lubricate these sliding portions.

When carbon dioxide is used as the refrigerant, a high-viscosity lubricant oil is used as the lubricant oil. Specifically, a lubricant oil having a viscosity of 5-300 cSt at a temperature of 40° C. may be used. The lubricant oil includes a polyalkylene glycol lubricant oil (such as a polyethylene glycol, a polypropylene glycol, etc.), an ether oil, an ester oil, and a mineral oil.

The compression mechanism section 2 has a cylinder-shaped body portion 20, an upper end portion 8 and a lower end portion 9 which are attached, respectively, to an upper opening end and a lower opening end of this body portion 20.

The rotating shaft 4 penetrates through the upper end portion 8, the body portion 20, and the lower end portion 9. The rotating shaft 4 is freely rotatably supported by a bearing 21 provided at the upper end portion 8 of the compression mechanism section 2 and a bearing 22 provided at the lower end portion 9 of the compression mechanism section 2.

The rotating shaft 4 in the body portion 20 is provided with a crank pin 5, and compression is performed in a compression chamber 7 formed between a piston 6, into which the crank pin 5 is fitted and which is driven by the crank pin 5, and a cylinder associated with the piston. The piston 6 eccentrically rotates or performs an orbital motion, and changes the volume of the compression chamber 7.

The motor 3 has a cylindrical shaped rotor 30 fixed to the rotating shaft 4, and a stator 40 disposed so as to surround an outer periphery of the rotor 30. The stator 40 is disposed radially outside of the rotor 30 via an air gap. That is, the motor 3 is an inner rotor type motor.

The stator 40 is fixed to the hermetic container 1 by welding. Upper and lower cross sections of the stator are each provided with three welded portions. The number of weldings may be decided depending on the weight and/or the natural frequency of the motor 3 and the like. Alternatively, the stator 40 may be fixed to the hermetic container 1 by press fitting or shrinkage fitting.

The rotor 30 has a rotor core 31 and magnets 32 which are embedded in the rotor core 31 in an axial direction of the rotor core and arranged circumferentially.

Figure 2:
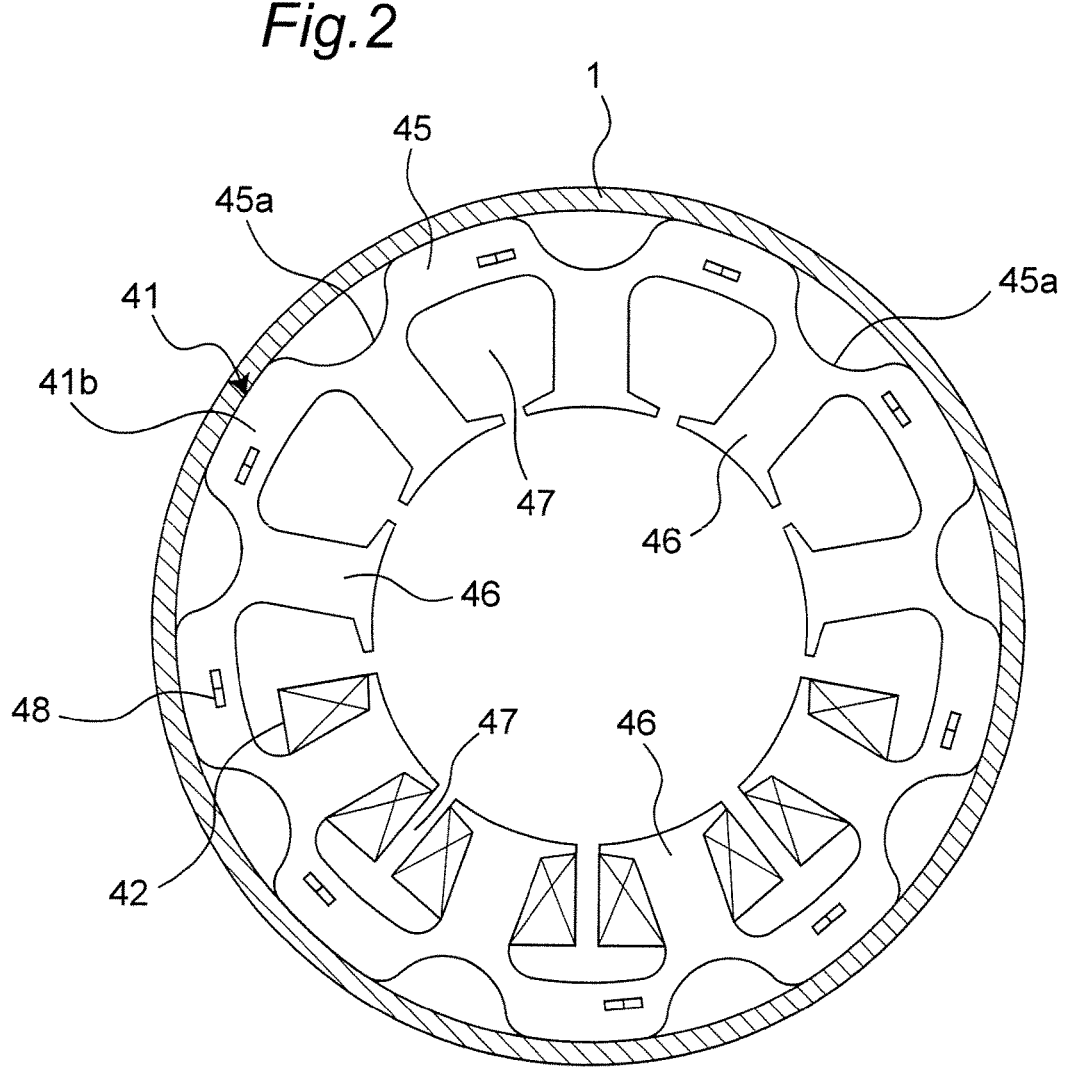
FIG. 2 is a lateral cross sectional view of an essential part of the compressor.

As shown in FIG. 1 and FIG. 2, the stator 40 has a stator core 41 in contact with an inner surface of the hermetic container 1, and coils 42 wound around the stator core 41.

The stator core 41 has a hollow circular cylindrical section 45, and nine teeth 46 protruding radially inward from an inner peripheral surface of the hollow circular cylindrical section 45 and arranged circumferentially.

The coil 42 is of a concentrated winding type wherein the coil is wound around each tooth 46 instead of being wound around a plurality of teeth 46. In FIG. 2, only part of the coil 42 is shown.

The stator core 41 has nine slots 47 which are open to the radially inside of the stator core, and arranged circumferentially. That is, each slot 47 is formed between adjacent ones of the teeth 46.

The stator core 41 includes a plurality of electromagnetic steel plates that are stacked one on another. The stator core 41 has swaged portions 48 for mutually fixing the plurality of electromagnetic plates. The swaged portions 48 are provided on the hollow circular cylindrical section 45. Each swaged portion 48 is located radially outside of the slots 47.

The stator core 41 has a plurality of oil passage grooves 45a that penetrate through two opposite surfaces of the stator core, which are one surface (a lower surface) 41a nearer to the oil sump 10 and the other surface (an upper surface) 41b farther from the oil sump 10.

These oil passage grooves 45a are notches provided at locations radially outside of the teeth 46, each oil passage groove being formed by cutting an outer peripheral surface of the hollow circular cylindrical section 45, and reaching a position corresponding to an inner periphery of the hollow circular cylindrical section 45 located radially outside of the teeth 46.

The nine oil passage grooves 45a are provided corresponding to the teeth 46. Each oil passage groove 45a is formed in a generally semi-circular shape, and utilized as a passage for passing a refrigerant or an oil.

The oil passage groove 45a is formed by a so-called core cut such as a recessed groove and a D-cut surface. The oil passage groove 45a is a space surrounded by an inner surface of the core cut and the inner surface of the hermetic container 1.

Regarding the other (upper) surface 41b of the stator core 41, the following relationships hold:

$$M=(1/4) \times \pi \times D^2, \text{ and } M/T \geq 0.4, \text{ where } T \text{ [mm}^2\text{]}$$

is an area of all the oil passage grooves 45a on the other surface 41b of the stator core 41, D [mm] is a hydraulic diameter of all the oil passage grooves 45a, and M [mm$^2$] is an equivalent area.

Assuming that the total area of all the oil passage grooves 45a on the other surface 41b of the stator core 41 is A [mm$^2$], and a total perimeter of all the oil passage grooves is B [mm$^2$], the hydraulic diameter D is expressed by $4 \times A/B$.

Figure 3:
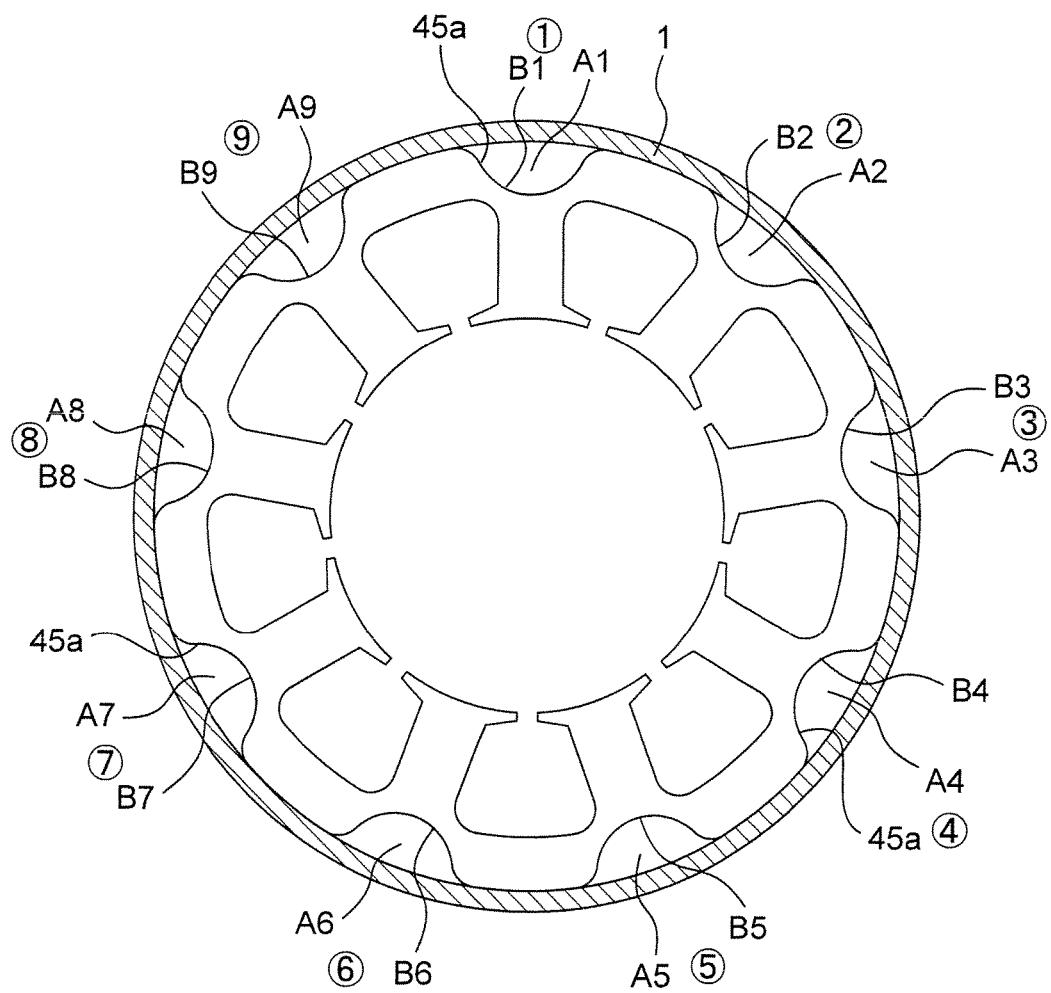
FIG. 3 is a lateral cross sectional view of an essential part of the compressor.

That is, as shown in FIG. 3, regarding the oil passage grooves 45a of circled numbers 1-9, assuming that their respective areas are A1-A9, and their respective perimeters are B1-B9, the hydraulic diameter D is expressed by:
$4\times(A1/B1+A2/B2+A3/B3+A4/B4+A5/B5+A6/B6+A7/B7+A8/B8+A9/B9)$.

Next, FIG. 4 shows whether oil return is good or poor in a relationship between a "ratio of an equivalent area of an outer periphery of a stator core to a core cut (oil passage grooves) area" and a "required equivalent area". The "equivalent area of the outer periphery of the stator core/the core cut area" corresponds to the above formula (M/T).

As is understood from FIG. 4, when the "equivalent area of the outer periphery of the stator core/the core cut area" is 0.4 or more, the oil return is evaluated as good ("o") in all the listed required equivalent areas, while when it is less than 0.4, the oil return is evaluated as poor ("x") in at least one listed required equivalent area.

The symbol "o" means that returning of oil to the oil sump of actual equipment has been confirmed. On the other hand, the symbol "x" means that returning of oil to the oil sump of the actual equipment hasn't been confirmed.

Further, the "required equivalent area" was calculated from the following empirical formula:

$$S = K \times V \times \eta^N$$

(where S is a required equivalent area [mm$^2$]; V is a volume of a cylinder (hermetic container) [cc]; $\eta$ is an oil viscosity [cSt]; N≈4 and K=1×e−7).

That is, in the compressor, the required equivalent area for the outer periphery of the stator core is proportional to the volume of the cylinder, as well as proportional to about a biquadrate of the viscosity of the lubricant oil.

Figure 5:
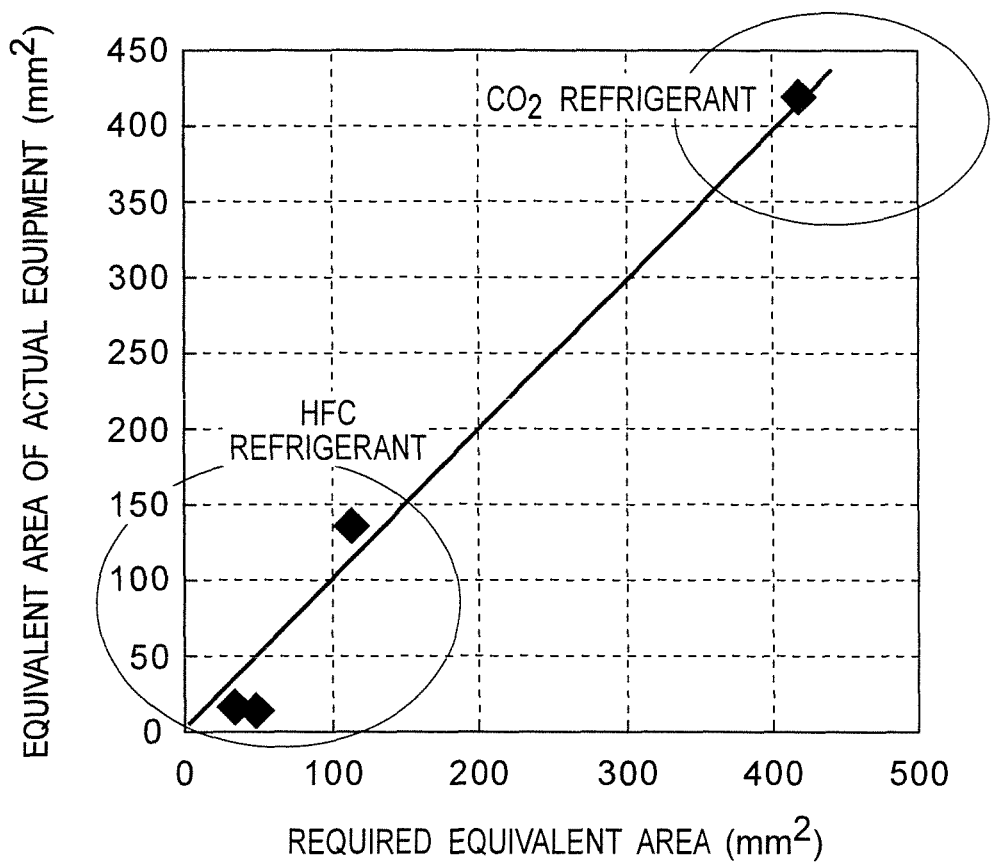
FIG. 5 is a graph showing a relationship between a "required equivalent area" and an "equivalent area of the actual equipment"

Values of the above constants N, K were found from FIG. 5. FIG. 5 is a graph showing a relationship between a "required equivalent area" and an "equivalent area of the actual equipment". In FIG. 5, values of equipment using a HFC refrigerant and values of equipment using a $CO^2$ refrigerant are plotted.

In the compressor with the above construction, the oil passage grooves 45a are notches provided at locations radially outside of the teeth 46, each oil passage groove 45a being formed by cutting the outer peripheral surface of the hollow circular cylindrical section 45, and reaching a position corresponding to the inner periphery of the hollow circular cylindrical section 45 located radially outside of the tooth 46. Therefore, a lubricant oil accumulated on the other surface 41b side of the stator core 41 can be returned to the oil sump 10 located to the one surface 41a side of the stator core 41 through the oil passage grooves 45a, and oil shortage in the oil sump 10 is prevented.

Since $M=(1/4)\times\pi\times D^2$, and $M/T \geq 0.4$ are satisfied, the oil passage grooves 45a can sufficiently be secured, and a lubricant oil accumulated on the other surface 41b side of the stator core 41 can be reliably returned to the oil sump 10 on the one surface 41a side of the stator core 41 through the oil passage grooves 45a.

Since the number of the teeth 46 is nine or more, and the coils 42 are wound around the stator core 41 by the concentrated winding scheme wherein the coil is wound around each tooth 46 instead of being wound around a plurality of teeth 46, the number of poles of the motor is increased and the width of the hollow circular cylindrical section 45 of the stator core 41 becomes small. However, it is possible to efficiently return the lubricant oil to the oil sump 10.

Since the oil passage groove 45a has a generally semi-circular shape in plan view, magnetic flux flows are secured to prevent deterioration in motor efficiency.

Since the refrigerant in the hermetic container 1 is carbon dioxide, a high-viscosity lubricant oil is used. However, it is possible to efficiently return the lubricant oil to the oil sump 10.

(Second Embodiment)

Figure 6:
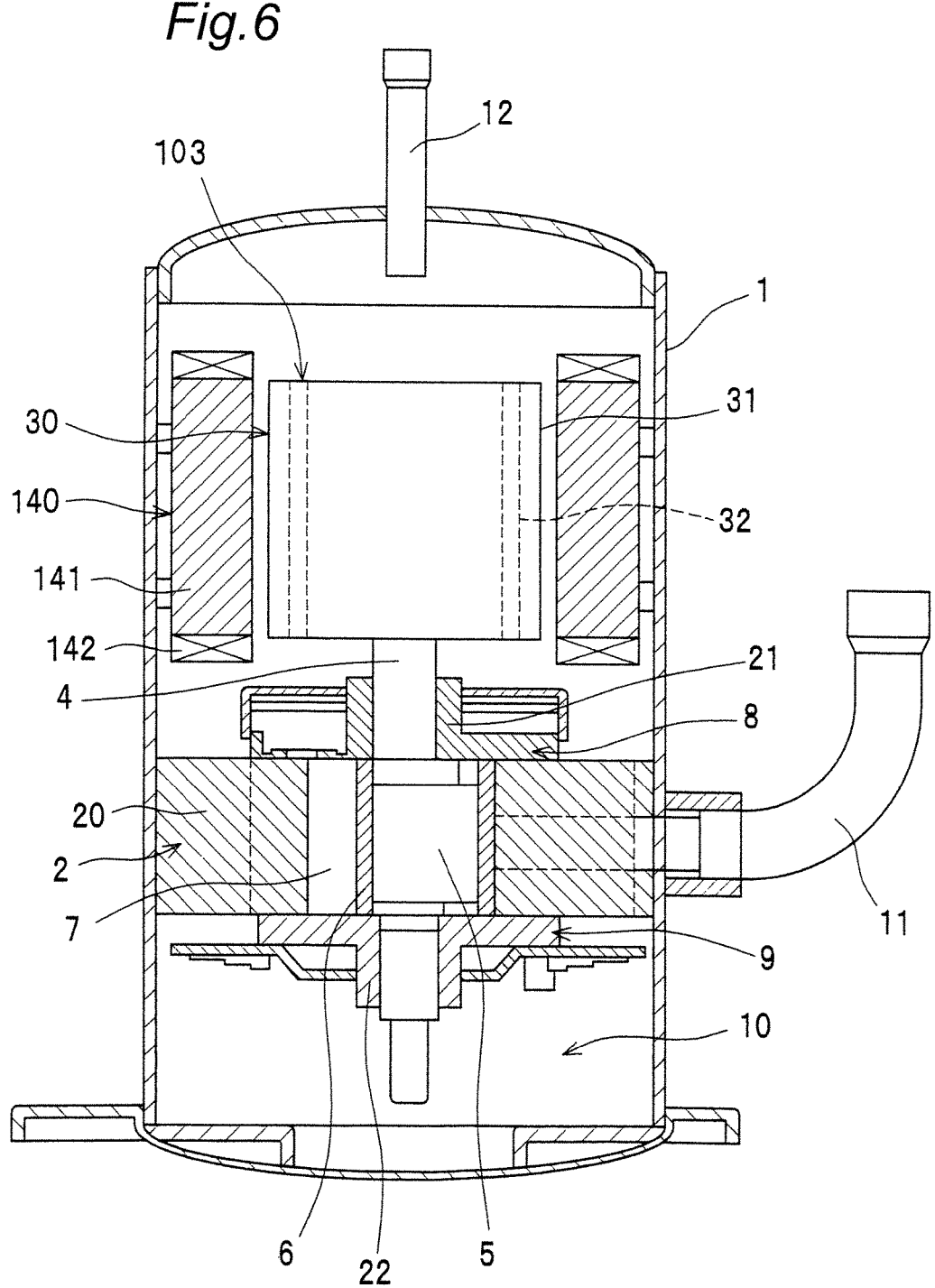
FIG. 6 is a vertical cross sectional view showing a second embodiment of the compressor of the present invention.

FIG. 6 shows a vertical cross sectional view of a second embodiment of the compressor of this invention. This compressor has a hermetic container 1, a compression mechanism section 2 disposed in the hermetic container 1, and a motor 103. This compressor is a rotary compressor.

A suction pipe 11 is connected to a lower lateral side of the hermetic container 1, while a discharge pipe 12 is connected at an upper side of the hermetic container 1. A refrigerant supplied from the suction pipe 11 is led to a suction side of the compression mechanism section 2. Although this refrigerant is carbon dioxide, it may be R1410A, R22 or the like.

The motor 103 is disposed above the compression mechanism section 2, and drives the compression mechanism section 2 through a rotating shaft 4. The motor 103 is disposed in a high-pressure region in the hermetic container 1, which is filled with a high-pressure refrigerant discharged from the compression mechanism section 2.

An oil sump 10 where a lubricant oil is stored is formed in a lower part of the hermetic container 1. This lubricant oil passes through oil passages (not shown), which are provided in the driving shaft 4, from the oil sump 10, and moves to sliding portions such as the compression mechanism section 2 and bearings of the motor 103 to lubricate these sliding portions.

When carbon dioxide is used as the refrigerant, a high-viscosity lubricant oil is used as the lubricant oil. The lubricant oil includes, for example, a polyalkylene glycol oil (such as a polyethylene glycol and a polypropylene glycol), an ether oil, an ester oil, and a mineral oil.

The compression mechanism section 2 includes a cylinder-shaped body portion 20, an upper end portion 8 and a lower and portion 9 attached, respectively, to an upper opening end and a lower opening end of this body portion 20.

The rotating shaft 4 penetrates through the upper end portion 8, the body portion 20, and the lower end portion 9. The rotating shaft 4 is freely rotatably supported by a bearing 21 provided at the upper end portion 8 of the compression mechanism section 2 and a bearing 22 provided at the lower end portion 9 of the compression mechanism section 2.

The rotating shaft 4 in the body portion 20 is provided with a crank pin 5, and compression is performed in a compression chamber 7 formed between a piston 6, into which the crank pin 5 is fitted and which is driven by the crank pin 5, and a cylinder associated with the piston. The piston 6 eccentrically rotates or performs an orbital motion, and change the volume of the compression chamber 7.

The motor 103 has a cylindrical shaped rotor 30 fixed to the rotating shaft 4, and a stator 40 disposed so as to surround an outer peripheral side of the rotor 30. The stator 40 is disposed radially outside of the rotor 30 via an air gap. That is, the motor 3 is an inner rotor type motor.

The stator 140 is fixed to the hermetic container 1 by welding. Upper and lower cross sections of the stator 140 are each provided with three welded portions. The number of weldings may be decided depending on the weight, natural frequency of the motor 103 and the like. Alternatively, the stator 40 may be fixed to the hermetic container 1 by press fitting or shrinkage fitting.

The rotor 30 has a rotor core 31 and magnets 32 which are embedded in the rotor core 31 in an axial direction of the rotor core and arranged circumferentially.

Figure 7:
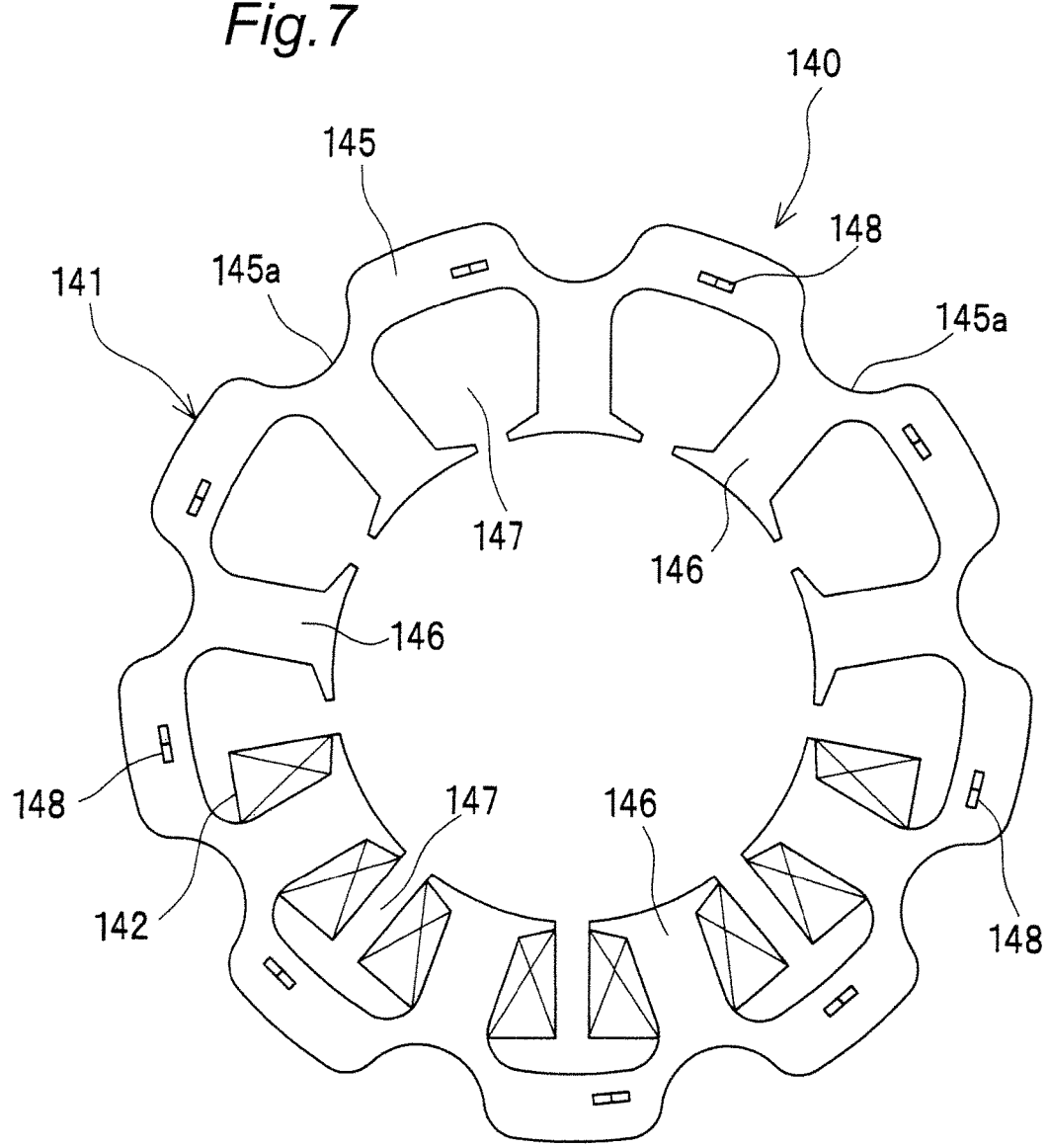
FIG. 7 is a plan view showing one embodiment of a stator of the present invention.

As shown in FIG. 6 and FIG. 7, the stator 140 has a stator core 141, and coils 142 wound around the stator core 141.

The stator core 141 has a hollow circular cylindrical section 145, and nine teeth 146 protruding radially inward from an inner peripheral surface of the hollow circular cylindrical section 145 and arranged circumferentially.

The coil 142 is of the concentrated winding type wherein the coil is wound around each tooth 146 instead of being wound around a plurality of teeth 146. In FIG. 7, only part of the coil 142 is shown.

The stator core 141 has nine slots 147 open to the radially inside of the stator core, and arranged circumferentially. That is, each slot 147 is formed between adjacent ones of the teeth 146.

The stator core 141 includes a plurality of electromagnetic steel plates that are stacked one on another. The stator core 141 has swaged portions 148 for mutually fixing the plurality of electromagnetic plates. The swaged portions 148 are provided on the hollow circular cylindrical section 145. Each swaged portion 148 is located radially outside of the slot 147.

The hollow circular cylindrical section 145 has oil passage grooves 145a radially outside of the teeth 146, each oil passage groove 145a being formed by cutting an outer peripheral surface of the hollow circular cylindrical section 145. The nine oil passage grooves 145a are provided in correspondence with the teeth 146. Each oil passage groove 145a is formed in a generally semi-circular shape, and utilized as a passage for passing a refrigerant or an oil.

Figure 8:
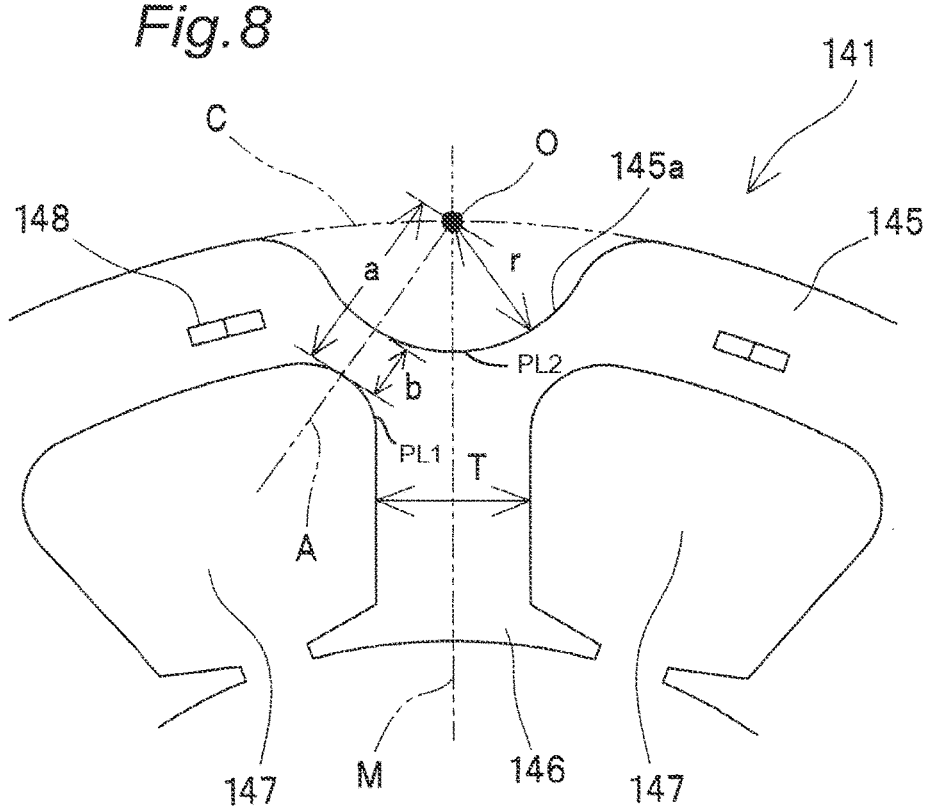
FIG. 8 is an enlarged view of the stator.

As shown in FIG. 8, in a plane perpendicular to the shaft of the stator core 141, assuming that, among those straight lines passing an intersection point "O" of an imaginary circle "C" circumscribing the hollow circular cylindrical section 145 and a center line "M" of a width of the tooth 146, a straight line having a shortest distance from the intersection point "O" to a profile line PL1 of the slot 147 is defined as an imaginary straight line "A", then a width "b" of the stator core 141 between a profile line PL2 of the oil passage groove 145a and the profile line PL1 of the slot 147 on this imaginary straight line "A" is ½ or more of the width, "T", of the tooth 146, and has a value equal to or smaller than a value obtained by subtracting 4 mm from the shortest distance "a" from the intersection point "O" to the profile line PL1 of the slot 147. The width "T" of the tooth 146 is a length in a direction perpendicular to the center line "M".

Therefore, since the width "b" of the stator core 141 is a half or more of the width "T" of the tooth 146, and has a value equal to or smaller than the value obtained by subtracting 4 mm from the shortest distance "a", the passages for oil return can be secured, while securing magnetic flux paths.

In contrast to that, if the width "b" of the stator core is less than ½ of the width "T" of the tooth 146, the width "b" of the stator core 141 becomes so narrow that magnetic flux paths cannot be secured. On the other hand, if the width "b" of the stator core 141 exceeds the value obtained by subtracting 4 mm from the shortest distance "a", the oil passage groove 145a becomes so narrow that a passage for oil return cannot be secured.

Figure 9:
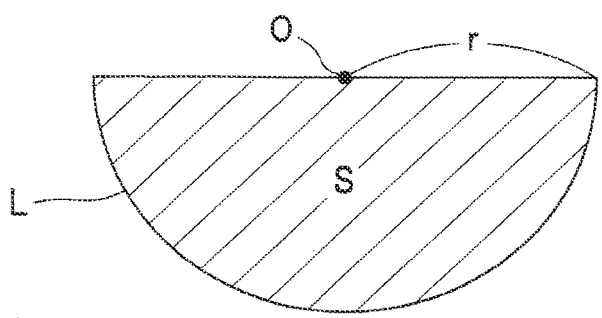
FIG. 9 is a drawing showing modeling of an oil passage groove.

The reason why the width "b" should assume a value equal to or smaller than the value obtained by subtracting 4 mm from the shortest distance "a" will be described. Assuming that the oil passage groove 145a in FIG. 8 has a semi-circular shape in plan view as shown in FIG. 9, the following formulas (1)-(3) hold.

$$S = \pi r^2/2 \quad (1)$$

$$L = r(\pi + 2) \quad (2)$$

$$d = 4S/L = 2\pi r/(\pi + 2) \quad (3),$$

where "d" is a hydraulic diameter, "r" is a radius of the semi-circle (oil passage groove), "S" is an area of the semi-circle (oil passage groove), and "L" is a perimeter of the semi-circle (oil passage groove).

Figure 10:
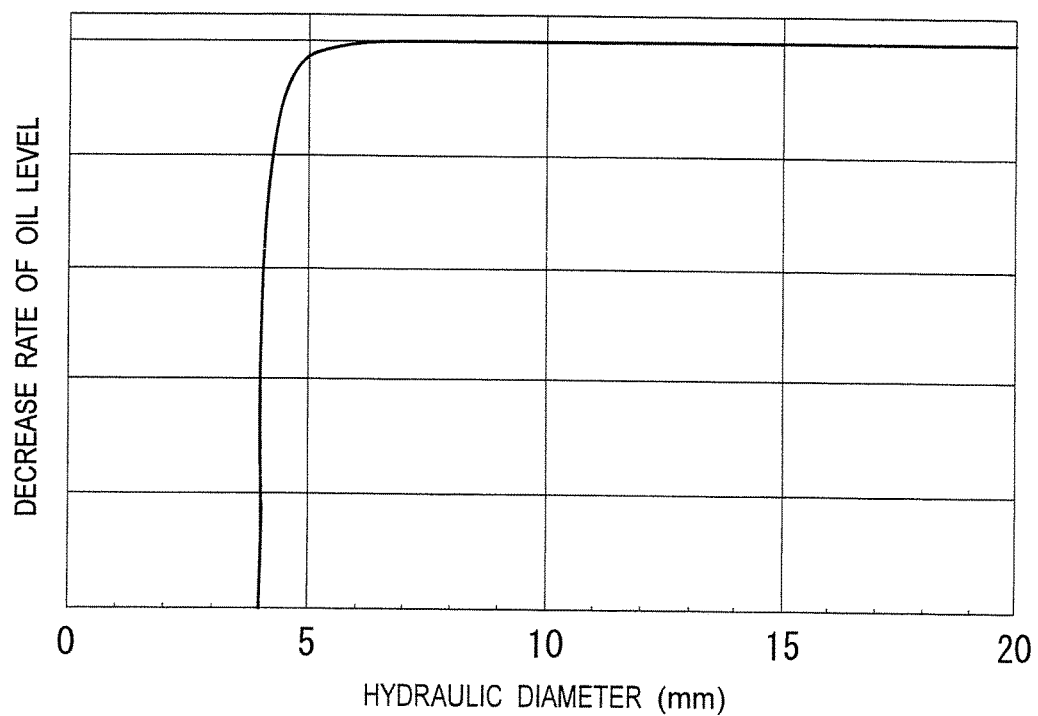
FIG. 10 is a graph showing a relationship between a hydraulic diameter and a decrease rate of oil level.

As apparent from FIG. 10, the hydraulic diameter needs to be 5 mm or more. FIG. 10 shows a relationship between the hydraulic diameter and a decrease rate of oil level. The ordinate axis shows the decrease rate of oil level. The oil level is reduced toward a lower side of the ordinate axis. As seen from FIG. 10, if the hydraulic diameter is smaller than 5 mm, the oil level is extremely reduced. In other words, since oil return properties become poor with a small hydraulic diameter, the oil level cannot be secured. Therefore, the hydraulic diameter is required to have a value of more than 5 mm.

From the above formulas (1) to (3), the radius r needs to be 4 mm or more. Therefore, as shown in FIG. 8, b=a−r≤a−4 mm holds, and the width "b" is a value equal to or smaller than the value obtained by subtracting 4 mm from the shortest distance "a".

Since the motor includes the stator 140 configured as above, magnetic flux paths are secured to prevent a reduction in efficiency, and also the passages for oil return are secured to prevent oil shortage in the oil sump.

Since the compressor includes the motor 103 configured as above, magnetic flux paths are secured to prevent a reduction in efficiency, and also the passages for oil return are secured to prevent oil shortage in the oil sump.

Since the refrigerant in the hermetic container 1 is carbon dioxide, the high-viscosity lubricant oil is used. However, the lubricant oil can efficiently be returned to the oil sump 10, and oil shortage in the oil sump can reliably be prevented.

(Third Embodiment)

Figure 11:
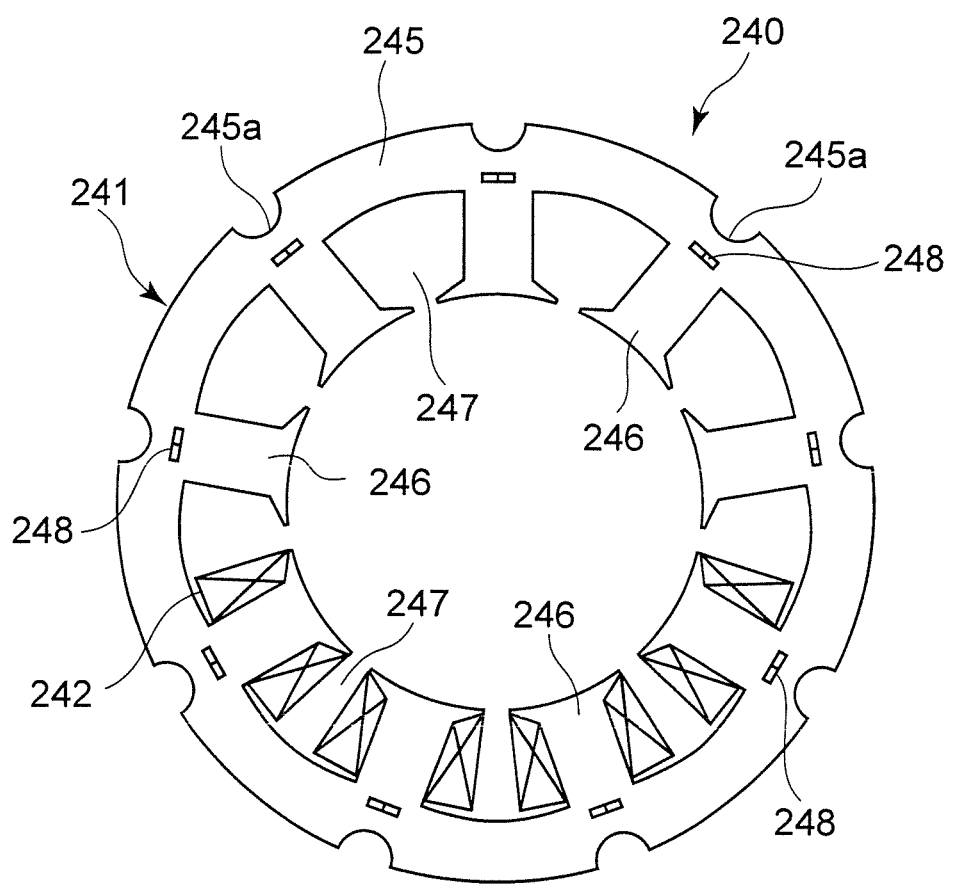
FIG. 11 is a plan view showing a third embodiment of the compressor of the present invention.

FIG. 11 shows a plan view of a third embodiment of a compressor of this invention. The third embodiment is different from the first and second embodiments in the construction of the stator. Since the construction of the other components are the same as or similar to those of the first and second embodiments, description of the other components will be omitted below.

As shown in FIG. 11, the stator 240 has a stator core 241 and coils 242 wound around the stator core 241.

The stator core 241 has a hollow circular cylindrical section 245, and nine teeth 246 protruding radially inward from an inner peripheral surface of the hollow circular cylindrical section 245 and arranged circumferentially.

The coils 242 are wound in the concentrated winding manner wherein the coils are wound around respective teeth 246 instead of a coil being wound around a plurality of teeth 246. In FIG. 11, only part of the coil 242 is shown.

The stator core 241 has nine slots 247 open to an inner peripheral side, that is, radially inside of the stator core, and arranged circumferentially. That is, these slots 247 are each formed or defined between adjacent ones of the teeth 246.

The stator core 241 includes a plurality of electromagnetic steel plates that are stacked. The stator core 241 has swaged portions 248 for mutually fixing the plurality of electromagnetic plates. The swaged portions 248 are provided on the circular cylindrical section 245. The swaged portions 248 are located radially outside of the respective teeth 246.

The circular cylindrical section 245 has a plurality of oil passage grooves 245a radially outside of the teeth 246, each oil passage groove 245a being formed by cutting an outer peripheral surface of the circular cylindrical section 245. The oil passage grooves 245a are disposed radially outside of the respective swaged portions 248, and do not reach the inner periphery of the circular cylindrical section 245. The nine oil passage grooves 245a are provided in one-to-one correspondence with the teeth 246. Each oil passage groove 245a is formed in a generally semi-circular shape, and utilized as a passage for passing a refrigerant and/or an oil.

Figure 12:
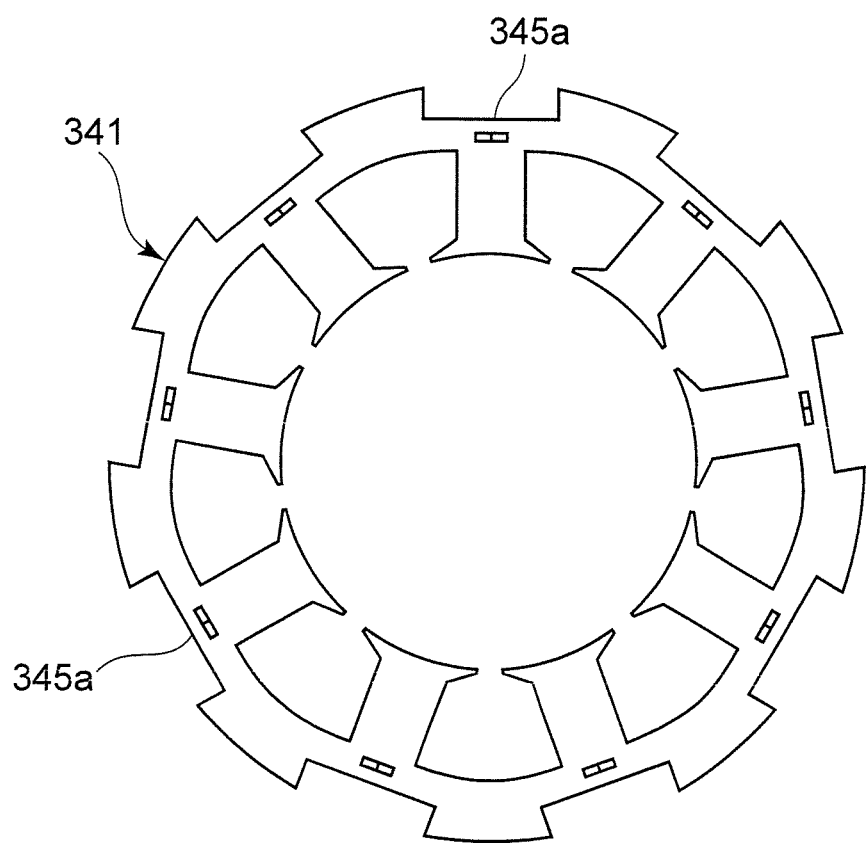
FIG. 12 is a plan view showing a comparative example of the stator core.

FIG. 12 shows a stator core 341 as a comparative example. The stator core 341 is different from the stator core 241 of FIG. 11 in the shape of oil passage grooves 345a. Each oil passage groove 345a is formed in a generally rectangular shape of which a peripheral length is longer than a radial length thereof in plan view.

Figure 13:
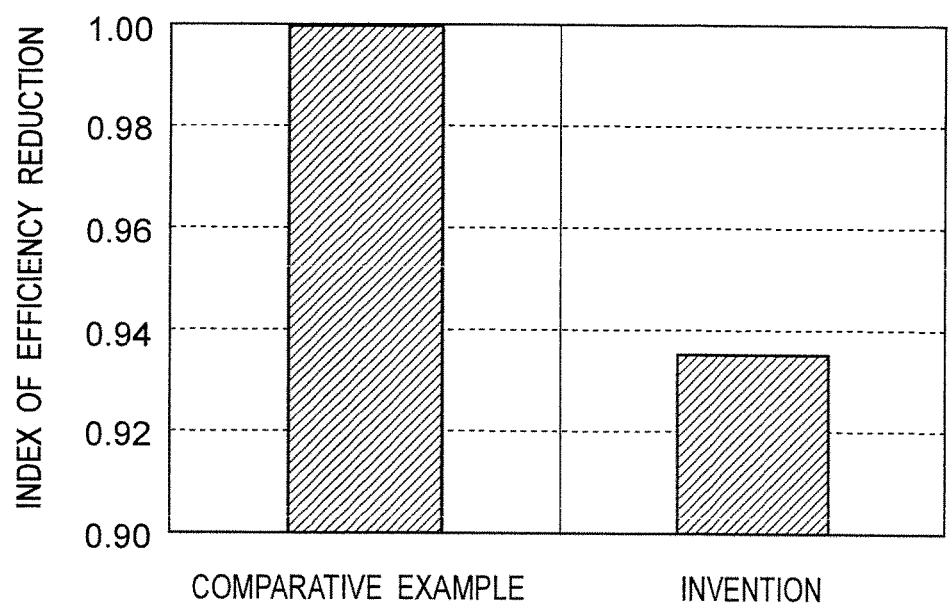
FIG. 13 is a graph showing an index of efficiency reduction of the stator core of the present invention as compared with an index of efficiency reduction of a stator core of the comparative example.

FIG. 13 shows a graph in which an index of efficiency reduction of the stator core 241 of FIG. 11 (hereinafter referred to as the present invention) is compared with an index of efficiency reduction of the stator core 341 of FIG. 12 (hereinafter referred to as the comparative example). The term "index of efficiency reduction" herein means an index of reduction in motor efficiency from the motor efficiency obtained by using a stator core having no notches serving as oil passage grooves in its circular cylindrical section. The smaller the index of efficiency reduction, the smaller the reduction in the motor efficiency.

As is understood from FIG. 13, the present invention has a smaller index of efficiency reduction and hence a smaller reduction in the motor efficiency than the comparative example. That is, the present invention has higher motor efficiency than the comparative example.

Figure 14:
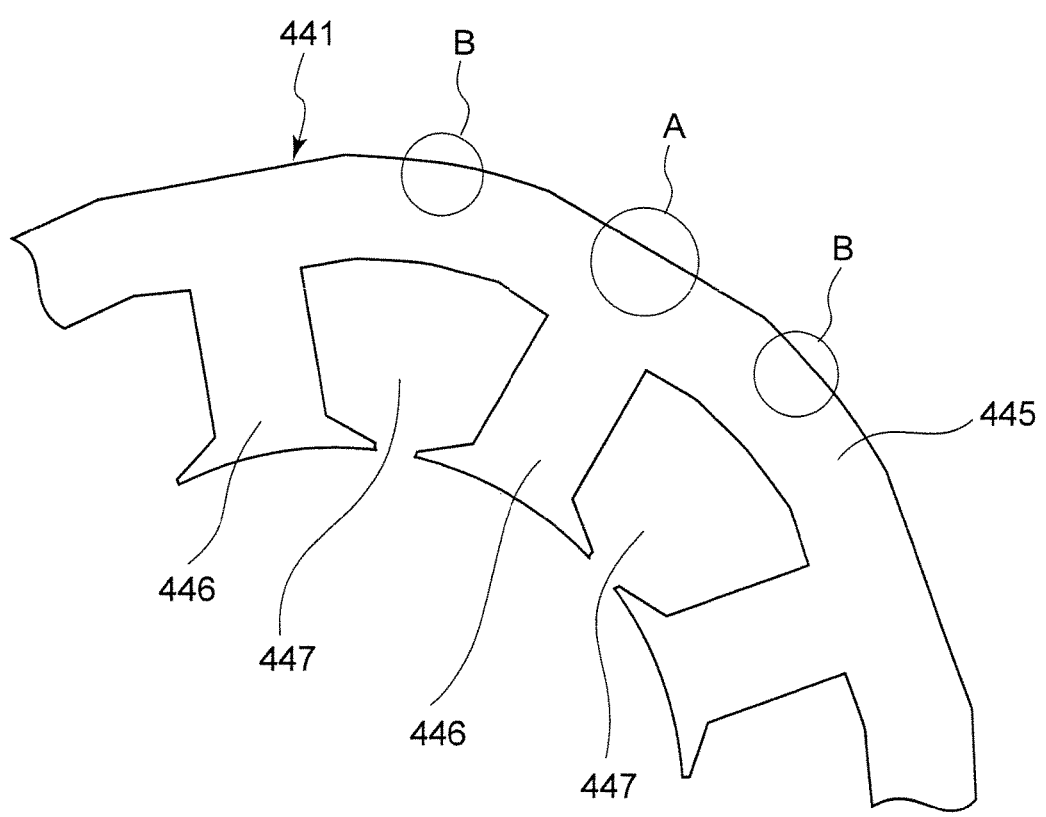
FIG. 14 is an explanatory drawing showing distribution of magnetic flux density in the stator core having no oil passage grooves.

The reason for this will be described. FIG. 14 shows a stator core 441 having no notches serving as oil passage grooves in its circular cylindrical section 445. In this stator core 441, a region A, circled, which is located radially outside of a tooth 446, has a lower magnetic flux density, while a region B, circled, which is located radially outside of a slot 447, has a higher magnetic flux density.

That is, in the present invention, the oil passage groove 245a formed in a semi-circular shape efficiently cuts the region A having a low magnetic flux density. Therefore, a reduction in the motor efficiency is small. On the other hand, in the comparative example, the oil passage groove 345a formed in a rectangular shape cuts the region B having a high magnetic flux density together with the region A. Therefore, a reduction in the motor efficiency becomes significant.

Figure 15:
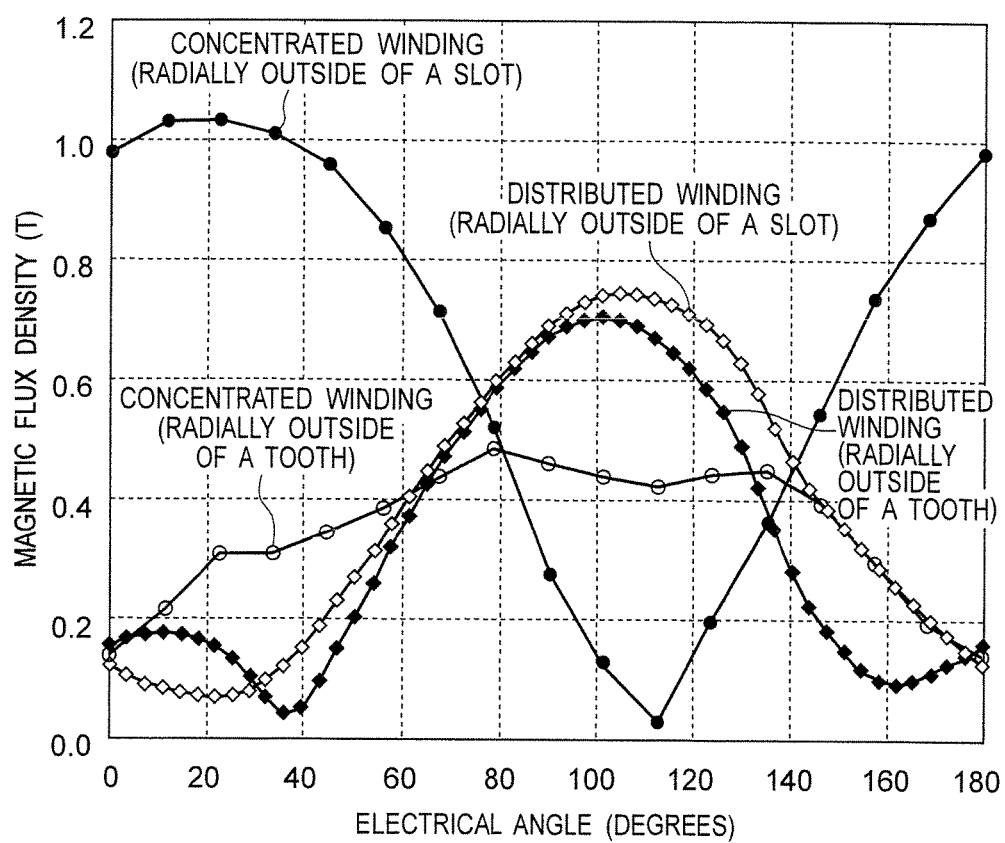
FIG. 15 is a graph showing changes in magnetic flux density in distributed winding and concentrated winding.

Next, FIG. 15 shows changes in magnetic flux density in distributed winding and concentrated winding. That is, it shows a relationship between the electrical angle and the magnetic flux density in a case where a coil was wound around a plurality of teeth using the stator core 441 of FIG. 14, namely, in the so-called distributed winding manner, and in a case where a coil was wound in the concentrated manner using the stator core 441 of FIG. 14.

In FIG. 15, the white rhombus represents a magnetic flux density at a location radially outside of a slot in the distributed winding. The black rhombus represents a magnetic flux density at a location radially outside of a tooth in the distributed winding. The black circle represents a magnetic flux density at a location radially outside of a slot in the concentrated winding. The white circle represents a magnetic flux density at a location radially outside of a tooth in the concentrated winding.

As is understood from FIG. 15, in the distributed winding, there is substantially no difference in the range of variation in magnetic flux density between the location radially outside of the tooth and the location radially outside of the slot. Therefore, the efficiency reduction is not changed even if the oil passage grooves are provided radially outside of the teeth or radially outside of the slots.

On the other hand, in the concentrated winding, the range of variation in magnetic flux density at the location radially outside of the tooth is smaller than the range of variation in magnetic flux density at the location radially outside of the slot. Therefore, providing the oil passage grooves radially outside of the teeth makes it possible to suppress the efficiency reduction as a whole to the minimum.

The effect of this third embodiment (FIG. 13 and FIG. 15) also holds true of the first and second embodiments because the oil passage grooves have a semi-circular shape, and the coil is wound in the concentrated manner in those embodiments.

This invention is not limited to the above embodiments. For example, features of the first to third embodiments may be variously combined. Further, for the compression mechanism section, a scroll type or a reciprocating type may be used instead of the rotary type. Further, the shape, position, and/or number of the oil passage grooves are not limited to the above embodiments.

What is claimed is:

1. A compressor comprising:
a hermetic container;
a compression mechanism section disposed in the hermetic container; and
a motor disposed in the hermetic container, the motor being configured and arranged to drive the compression mechanism section,
the motor having a rotor, and a stator disposed so as to surround an outer periphery of the rotor,
the stator including
a stator core having a hollow circular cylindrical section that is substantially ring shaped and has a radially inner peripheral surface and a radially outer peripheral surface, and a plurality of circumferentially arranged teeth protruding radially inward from the radially inner peripheral surface of the hollow circular cylindrical section, the radially inner peripheral surface being coincident with an imaginary circle in a plane perpendicular to a shaft of the compressor, and
oil passage grooves located radially outside of the teeth, the oil passage grooves being formed by cutting the radially outer peripheral surface of the hollow circular cylindrical section,
in the plane perpendicular to the shaft of the compressor, bottoms of the oil passage grooves tangentially reaching the imaginary circle aligned with the radially inner peripheral surface of the hollow circular cylindrical section.

2. The compressor according to claim 1, wherein
the hermetic container has an oil sump, and
the oil passage grooves penetrate through a first surface of the stator core and a second surface of the stator core farther from the oil sump than the first surface.

3. The compressor according to claim 2, wherein the second surface of the stator core is configured and arranged such that $M=(\frac{1}{4}) \times \pi \times D^2$, and $M/T \geq 0.4$, where
T is a total area of all the oil passage grooves on the second surface of the stator core measured in $mm^2$,
D is a hydraulic diameter of all the oil passage grooves combined, measured in mm, and
M is an equivalent area measured in $mm^2$.

4. The compressor according to claim 1, wherein
the plurality of circumferentially arranged teeth includes at least nine teeth, and
coils wound around the stator core are concentrated winding type coils wound around selective teeth instead of being wound around all of the plurality of teeth.

5. The compressor according to claim 1, wherein
the oil passage grooves have generally semi-circular shapes as seen along a direction parallel to a rotation axis of the motor.

6. The compressor according to claim 1, wherein
a refrigerant in the hermetic container is carbon dioxide.

7. The compressor according to claim 1, wherein the hollow circular cylindrical section includes a swaged portion located radially outside of a slot formed between adjacent ones of the teeth, and in the plane perpendicular to the shaft of the compressor, an intersection point of an imaginary circle circumscribing the hollow circular cylindrical section and a radial center line of a width of one of the teeth is defined, a straight line having a shortest distance measured from the intersection point to a profile line of one of the slots adjacent the one of the teeth is defined as an imaginary straight line, and a width of the stator core measured between a profile line of the oil passage groove and the profile line of the slot along the imaginary straight line is at least ½ of a minimum width of the one of the teeth, and has a value equal to or smaller than a value obtained by subtracting 4 mm from a shortest distance measured from the intersection point to the profile line of the slot.

8. The compressor according to claim 1, wherein
each of the oil passage grooves is circumferentially aligned with a respective one of the teeth.

9. A compressor comprising:
a hermetic container;
a compression mechanism section disposed in the hermetic container; and
a motor disposed in the hermetic container, the motor being configured and arranged to drive the compression mechanism section,
the motor having a rotor, and a stator disposed so as to surround an outer periphery of the rotor,
the stator including
a stator core having a hollow circular cylindrical section that is substantially ring shaped and has a radially inner peripheral surface and a radially outer peripheral surface, a plurality of circumferentially arranged teeth protruding radially inward from the radially inner peripheral surface of the hollow circular cylindrical section, and a plurality of circumferentially arranged slots alternating with the plurality of teeth, each slot being defined by facing side surfaces of adjacent two teeth and a part of the radially inner surface of the hollow circular cylindrical section between the adjacent two teeth, the radially inner peripheral surface being coincident with an imaginary circle in a plane perpendicular to a shaft of the compressor, and oil passage grooves located radially outside of the teeth, the oil passage grooves being formed by cutting the radially outer peripheral surface of the hollow circular cylindrical section, in the plane perpendicular to the shaft of the compressor, bottoms of the oil passage grooves tangentially reaching the imaginary circle aligned with the radially inner peripheral surface of the hollow circular cylindrical section, an intersection point of an imaginary circle circumscribing the hollow circular cylindrical section and a radial center line of a width of one of the teeth is defined, a straight line having a shortest distance measured from the intersection point to a profile line of one of the slots adjacent the one of the teeth is defined as an imaginary straight line, and a width of the stator core measured between a profile line of the oil passage groove and the profile line of the slot along the imaginary straight line is at least ½ of a minimum width of the one of the teeth, but smaller than the minimum width of the one of the teeth.

10. The compressor according to claim 9, wherein the width of the stator core has a value equal to or smaller than a value obtained by subtracting 4 mm from a shortest distance measured from the intersection point to the profile line of the slot.

11. The compressor according to claim 9, wherein each of the oil passage grooves is circumferentially aligned with a respective one of the teeth.

12. The compressor according to claim 9, wherein the plurality of circumferentially arranged teeth includes at least nine teeth, and coils wound around the stator core are concentrated winding type coils wound around selective teeth instead of being wound around all of the plurality of teeth.

13. The compressor according to claim 9, wherein the oil passage grooves have generally semi-circular shapes as seen along a direction parallel to a rotation axis of the motor.

14. The compressor according to claim 9, wherein a refrigerant in the hermetic container is carbon dioxide.

* * * * *

UNITED STATES PATENT AND TRADEMARK OFFICE
CERTIFICATE OF CORRECTION

| | | |
|---|---|---|
| PATENT NO. | : 9,929,607 B2 | Page 1 of 1 |
| APPLICATION NO. | : 12/864423 | |
| DATED | : March 27, 2018 | |
| INVENTOR(S) | : Kataoka et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1790 days.

Signed and Sealed this
Twenty-third Day of April, 2019

Andrei Iancu
*Director of the United States Patent and Trademark Office*